L. G. GADD.
RECORDER.
APPLICATION FILED JULY 25, 1911.
1,067,912. Patented July 22, 1913.
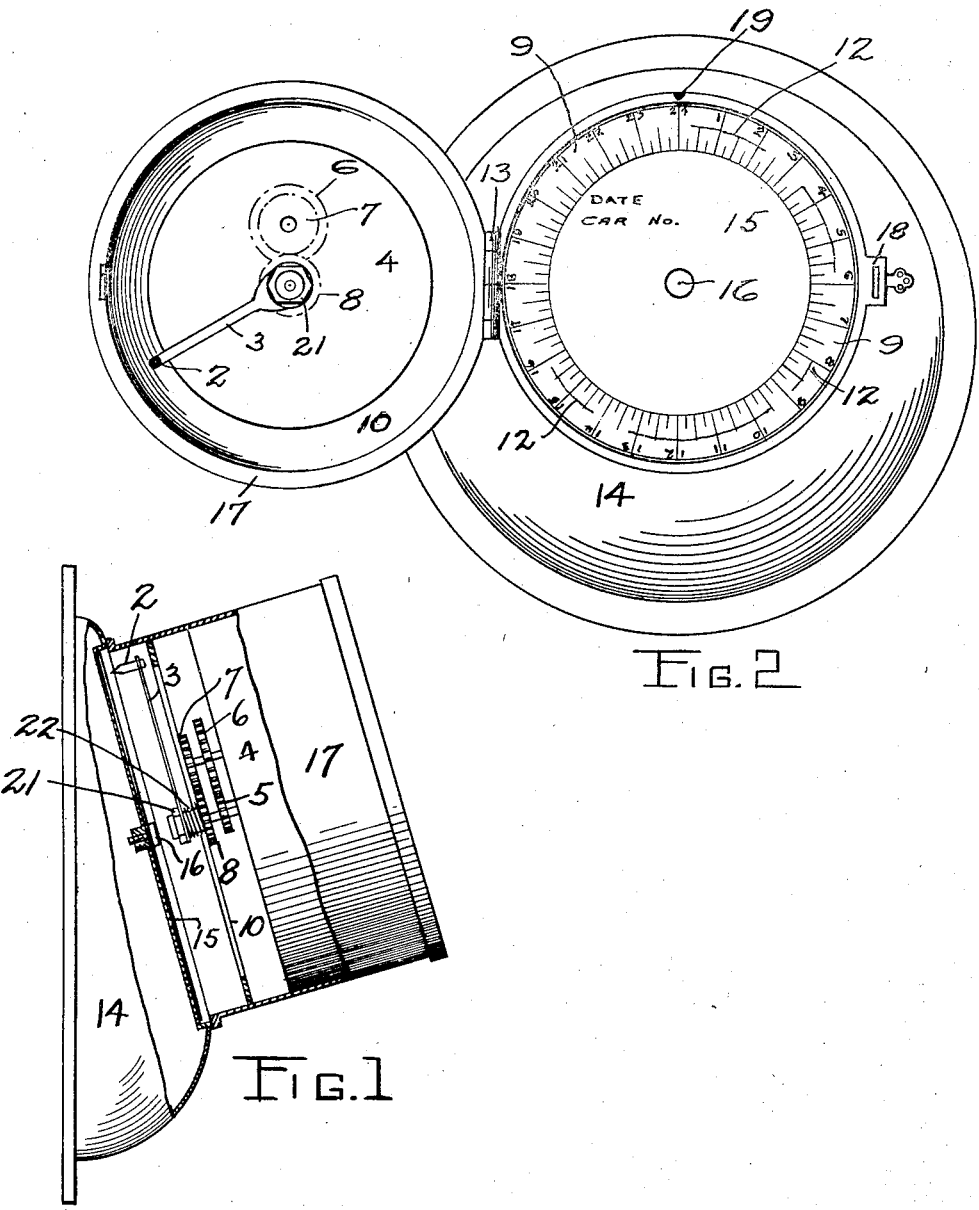
WITNESSES
INVENTOR
LORENZO G. GADD
BY
ATTORNEYS

UNITED STATES PATENT OFFICE.

LORENZO G. GADD, OF SAN FRANCISCO, CALIFORNIA.

RECORDER.

1,067,912.

Specification of Letters Patent. Patented July 22, 1913.

Application filed July 25, 1911. Serial No. 640,480.

*To all whom it may concern:*

Be it known that I, LORENZO G. GADD, a subject of Great Britain, and a resident of the city and county of San Francisco, State of California, have invented certain new and useful Improvements in Recorders, of which the following is a specification.

The invention relates to recorders which are adapted to record elapsed time and more particularly to recorders which record the duration and time of operation of the device to which they are attached.

The object of the invention is to provide a recorder, adapted to be attached to a vehicle, which will record the time when such vehicle is in motion.

A further object of the invention is to provide a recorder which is independent of the running gear of the vehicle to which it is attached, and which will record on an impression surface the duration of the times when the vehicle is in motion and the time of such trips.

This device possesses other advantageous features, which with the foregoing will be set forth at length in the following description, where I shall outline in full that form of embodiment of the invention which I have selected for illustration in the drawing accompanying and forming part of the present specification. The novelty of the invention will be included in the claim succeeding said description. From this it will be apparent that I do not restrict myself to the showing made by such drawings and descriptions, as I may adopt many variations within the scope of my invention as expressed in said claim.

The device of my invention is primarily adapted to be used on vehicles, such as taxicabs, to furnish the officers of the company operating the vehicles with a record showing at which hours and for what duration of time the vehicle is in motion, although it may be used in other situations to produce the same result. Heretofore, as far as I am aware, the officials of the company operating the taxicabs have had no means of checking the readings of the taximeter to determine their correctness.

Taximeters are generally provided with a lever which throws the registering mechanism in or out of operation when the car is chartered or vacant and when the mechanism is thrown out of operation the car may be driven without causing the meter to register. When no such lever is provided and the mechanism is always in gear, the connection between the running gear and the meter may be broken and the car driven without effecting the register. These steps have been taken by dishonest drivers in order to cheat the company and it is the object of this invention to make such fraud impossible.

The device of my invention is self contained and is not operated from the running gear, so that it cannot be disconnected or tampered with in any way, except by destroying the device.

Referring to the drawings: Figure 1 is a side view, partly in section showing the device arranged in a casing so that it sets at an angle to the surface to which it is attached. Fig. 2 is a view of the device in the open position showing the marking mechanism and the impression surface.

The device consists of a pointer or marking element 2 mounted on a spring or other vibrating element 3 which is driven by a clock mechanism inclosed in the case 4. The spring 3 is rotated by the clock mechanism, at any rate which is desirable. In the present construction I have shown the spring operated from the hour hand shaft of the clock and by means of the intermediate gears 5—6—7—8 cause the spring and therefore the pointer to make one complete revolution in twenty-four hours.

Arranged behind the pointer 2 in a plane parallel to the plan of rotation of the pointer is an impression surface 9 which may be provided with markings corresponding to the rate of movement of the pointer. The flexibility of the spring 3 and the distance between the pointer and the impression surface is such that when the vehicle to which the recorder is attached is in motion, the jolting and vibration of the vehicle will cause the spring to vibrate to make a mark, such as 12 on the impression surface 9. The position and extent of this mark will indicate the time during which the vehicle is in motion. In taxicabs, which are power driven, I prefer to make the spring of such rigidity that when the motor is operating and the vehicle is stationary no mark will be made upon the impression surface. It is evident that the impression surface 9 and the spring 3 may be interchanged, so that the surface revolves and the spring is held stationary. The surface is marked only when the vehicle is in motion, so that a glance at the card will show exactly during which periods of time the vehicle was traveling. Excessive vibration of the spring 3 and the pointer 2 is prevented by means of the backing ring 10 which is spaced at a suitable distance away from the pointer when it is at rest, to allow it to mark the surface as it vibrates. An excessive vibration which would tend to alter the adjustment is thereby prevented. The spring 3 is held in place on its shaft between the nut 21 and the spring 22 so that the position of the pointer with regard to the impression surface may be adjusted to suit different conditions of travel. It is evident that on some vehicles the amount of jarring and vibration will be greatly in excess of that on other vehicles. The shaft which carries the spring 3 is made square at that point where the spring engages so that there will be no displacement of the spring on the shaft as it revolves.

The device is mounted in a casing which is divided into two parts, hinged together at 13. The lower part or base 14 is provided with a suitable seat for the impression surface and with means for holding the card or paper 15 containing said impression surface in position. This means may comprise a flat headed screw 16 or any other suitable means for holding the card firm and rigid. The clock mechanism and the pointer operating means are arranged in the front part of the casing 17, the clock face being visible at the front. The two parts of the casing are secured at the side opposite the hinge 13 by a lock 18, so that access may not be had to the record. The key to this lock is retained by the company for obvious reasons.

The impression surface may be formed of any desired material, such as smoked paper, prepared paper, or plain paper, and the pointer or marker 2 may be made of any suitable element to correspond with the impression surface used. The card bearing the impression surface may also bear suitable identification marks for the use of the company. In the present construction, the card should be changed every twenty-four hours, and the casing is provided with an indicating mark 19, so that the surface may be properly placed.

By means of the record thus obtained, the company operating the vehicles has a complete check on the taximeter and will readily detect any fraud on the part of the driver of the vehicle.

I claim:

In a vibration recorder, a base having a depressed front face adapted to receive an impression surface, a casing hinged to said base and being movable to expose or conceal the impression surface, a clock movement in said casing, a shaft in said clock movement arranged centrally of the case, a flat spring attached to said shaft, a marker attached to the outer end of said spring adapted to move in a plane adjacent to and parallel to the impression surface when the casing is closed on the base, and means for adjusting the plane of movement of said marker with respect to the impression surface.

LORENZO G. GADD.

Witnesses:
H. G. PROST,
R. HEFFERNAN,